United States Patent [19]

McInerney et al.

[11] Patent Number: 4,522,261

[45] Date of Patent: Jun. 11, 1985

[54] BIOSURFACTANT AND ENHANCED OIL RECOVERY

[75] Inventors: Michael J. McInerney; Gary E. Jenneman; Roy M. Knapp; Donald E. Menzie, all of Norman, Okla.

[73] Assignee: The Board of Regents for the University of Oklahoma, Norman, Okla.

[21] Appl. No.: 482,308

[22] Filed: Apr. 5, 1983

[51] Int. Cl.³ .............................................. E21B 43/22
[52] U.S. Cl. ................................... 166/246; 166/273; 166/305 R; 252/8.55 D; 435/281
[58] Field of Search .................. 166/246, 305 R, 273; 252/8.55 D; 435/281

[56] References Cited

U.S. PATENT DOCUMENTS

| | | |
|---|---|---|
| 2,413,278 | 12/1946 | Zobell . |
| 2,975,835 | 3/1961 | Bond . |
| 3,032,472 | 5/1962 | Hitzman .......................... 435/281 X |
| 3,288,211 | 11/1966 | Johnston . |
| 3,305,016 | 2/1967 | Lindblom et al. . |
| 3,326,286 | 6/1967 | Harvey . |
| 3,340,930 | 9/1967 | Hitzman . |
| 3,391,060 | 7/1968 | McNeely . |
| 3,844,348 | 10/1974 | Stratton ............................... 166/246 |
| 3,853,771 | 12/1974 | Felmann et al. ................ 252/8.55 B |
| 3,937,520 | 2/1976 | Sievert ...................................... 299/4 |
| 3,966,618 | 6/1976 | Colegrove ...................... 252/8.55 D |
| 4,010,071 | 3/1977 | Colegrove . |
| 4,085,972 | 4/1978 | Ghosh et al. ............................ 299/7 |
| 4,119,546 | 10/1978 | Wernau ......................... 252/8.55 D |
| 4,128,482 | 12/1978 | Knight ........................... 252/8.55 D |
| 4,141,842 | 2/1979 | Abdo ............................. 252/8.55 D |
| 4,184,547 | 1/1980 | Klass et al. .......................... 166/246 |
| 4,300,632 | 11/1981 | Wiberger et al. .................... 166/246 |
| 4,332,297 | 6/1982 | Sandiford ............................. 166/270 |
| 4,349,633 | 9/1982 | Worne et al. ......................... 435/281 |
| 4,352,741 | 10/1982 | Wernau ......................... 252/8.55 D |

OTHER PUBLICATIONS

B. Bubela, 1983, Physical Simulation of Microbiological Enhanced Oil Recovery, in: *Microbial Enhanced Oil Recovery*, J. E. Zajic et al., (eds.), Penn Well Books, Tulsa, OK., pp. 1–7.

J. E. Zajic et al., Biosurfactants in Bitumen Separation from Tar Sands, ibid, pp. 50–54.

F. Wagner et al., Production and Chemical Characterization of Surfactants from *Rhodococcus erythropolis* and *Pseudomonas* sp. MUB Grown on Hydrocarbons, ibid, pp. 55–60.

B. A. Ramsay et al., Rhodochrous Bacteria: Biosurfactant Production and Demulsifying Ability, ibid, pp. 61–65.

W. L. Cairns et al., Bacteria-Induced Demulsification, ibid, pp. 106–113.

L. Guerra-Santos et al., 1983, Growth and Biosurfactant Production of a Bacteria in Continuous Culture, in: E. R. Donaldson and J. B. Clark, (eds.), *Proceedings of the 1982 International Conference on Microbial Enhancement of Oil Recovery*, U.S. Dept. of Energy, Bartlesville, OK, pp. 12–14.

M. E. Singer et al., Microbial Processes in the Recovery of Heavy Petroleum, ibid, pp. 94–101.

D. G. Cooper, Biosurfactants and Enhanced Oil Recovery, ibid, pp. 112–114.

A. W. Bernheimer et al., 1970, Nature and Properties of a Cytolytic Agent Produced by *Bacillus subtilis*, J. Gen. Microbiol., 61: 361–369.

K. Arema et al., 1968, Surfactin, A Crystalline Peptidelipid Surfactant Produced by *Bacillus subtilis*: Isolation, Characterization, and its Inhibition of Fibrin Clot Formation, Biochem. Biophys. Res. Comm., 31: 488–494.

(List continued on next page.)

*Primary Examiner*—George A. Suchfield
*Attorney, Agent, or Firm*—Dunlap & Codding

[57] ABSTRACT

A pure culture of *Bacillus licheniformis* strain JF-2 (ATCC No. 39307) and a process for using said culture and the surfactant lichenysin produced thereby for the enhancement of oil recovery from subterranean formations. Lichenysin is an effective surfactant over a wide range of temperatures, pH's, salt and calcium concentrations.

22 Claims, 1 Drawing Figure

OTHER PUBLICATIONS

J. Aket et al., 1981, Investigation of Potential Biosurfactant Production Among Phytopathogenic Corynebacteria and Related Soil Microbes, Current Microbiol., 6: 145–150.

J. E. Zajic et al., 1977, Properties and Biodegradation of a Bioemulsifier from *Corynebacterium hydrocarboclastus,* Biotech. Bioengin., 19: 1303–1320.

J. E. Zajic et al., 1977, Emulsifying and Surface Active Agents from *Corynebacterium hydrocarboclastus,* Biotech. Bioengin., 19: 1285–1301.

D. G. Cooper et al., 1980, Isolation and Identification of Biosurfactants Produced During Anaerobic Growth of *Clostridium pasteurianum,* J. Ferment. Technol., 58: 83–86.

D. G. Cooper et al., 1981, Enhanced Production of Surfactin from *Bacillus subtilis* by Continuous Product Removal and Metal Cation Additions, Appl. Environ. Microbiol., 42: 408–412.

C. R. MacDonald et al., 1981, Surface Active Lipids from *Nocardia erythropolis* Grown on Hydrocarbons, Appl. Environ. Microbiol., 41: 117–123.

J. E. Zajic et al., 1976, Bio–Emulsifiers, CRC. Cut. Rev. Microbiol., 5: 39–66.

D. G. Cooper et al., 1980, Surface Active Compounds from Microorganisms, Adv. Appl. Microbiol., 26: 229–253.

S. Ito et al., 1982, Sophorolipids from *Torulopsis bombicola:* Possible Relation to Alkane Uptake, Appl. Environ. Microbiol., 43: 1278–1283.

S. Inoue et al., 1982, Sophorolipids from *Torulopsis bombicola* as Microbial Surfactants in Alkane Fermentations, Biotech. Lttrs., 4: 3–8.

Z. Zosim et al., 1982, Properties of Hydrocarbon–In–Water Emulsions Stabilized by *Acinetobacter* RAG–1 Eulsan, Biotech. Bioengin., 24: 281–292.

E. Rosenberg et al., 1979, Emulsifier of *Arthrobacter* RAG–1: Isolation and Emulsifying Properties, Appl. Environ. Microbiol., 37: 402–408.

E. Rosenberg et al., 1979, Emulsifier of *Arthrobacter* RAG–1: Specificity of Hydrocarbon Substrate, Appl. Environ. Microbiol., 37: 414–420.

A. Zuckerberg et al., 1979, Emulsifier of *Arthrobacter* RAG–1: Chemical and Physical Properties, Appl. Environ. Microbiol., 37: 414–420.

J. W. M. LaRiviere, 1955, The Production of Surface Active Compounds by Microorganisms and its Possible Significance in Oil Recovery, II. On the Release of Oil from Oil–Sand Mixtures with the Aid of Sulfate–Reducing Bacteria, Antonie van Leeuwenhoek, J. of Serol. 21: 9–27.

J. W. M. LaRiviere, 1955, The Production of Surface Active Compounds by Microorganisms and its Possible Significance in Oil Recovery, I. Some General Observations on the Change of Surface Tension in Microbial Cultures, Antonie van Leeuwenhoek, J. Microbiol. Serol., 21: 1–8.

D. F. Gersen et al., 1979, Comparison of Surfactant Production from Kerosene by Four Species of *Corynebacterium.*

D. G. Cooper et al., 1979, Production of Surface Active Lipids by *Corynebacterium lipus.*

D. F. Gerson et al., 1977, Surfactant Production from Hydrocarbons by *Corynebacterium lipus* sp. nov. and *Pseudomonas asphaltenicus* sp. nov., Dev. Ind. Microbiol., 19: 577–599.

C. J. Panehal et al., 1978, Isolation of Emulsifying Agents from a Species of *Corynebacterium.,* Devel. Ind. Microbiol., 19: 569–576.

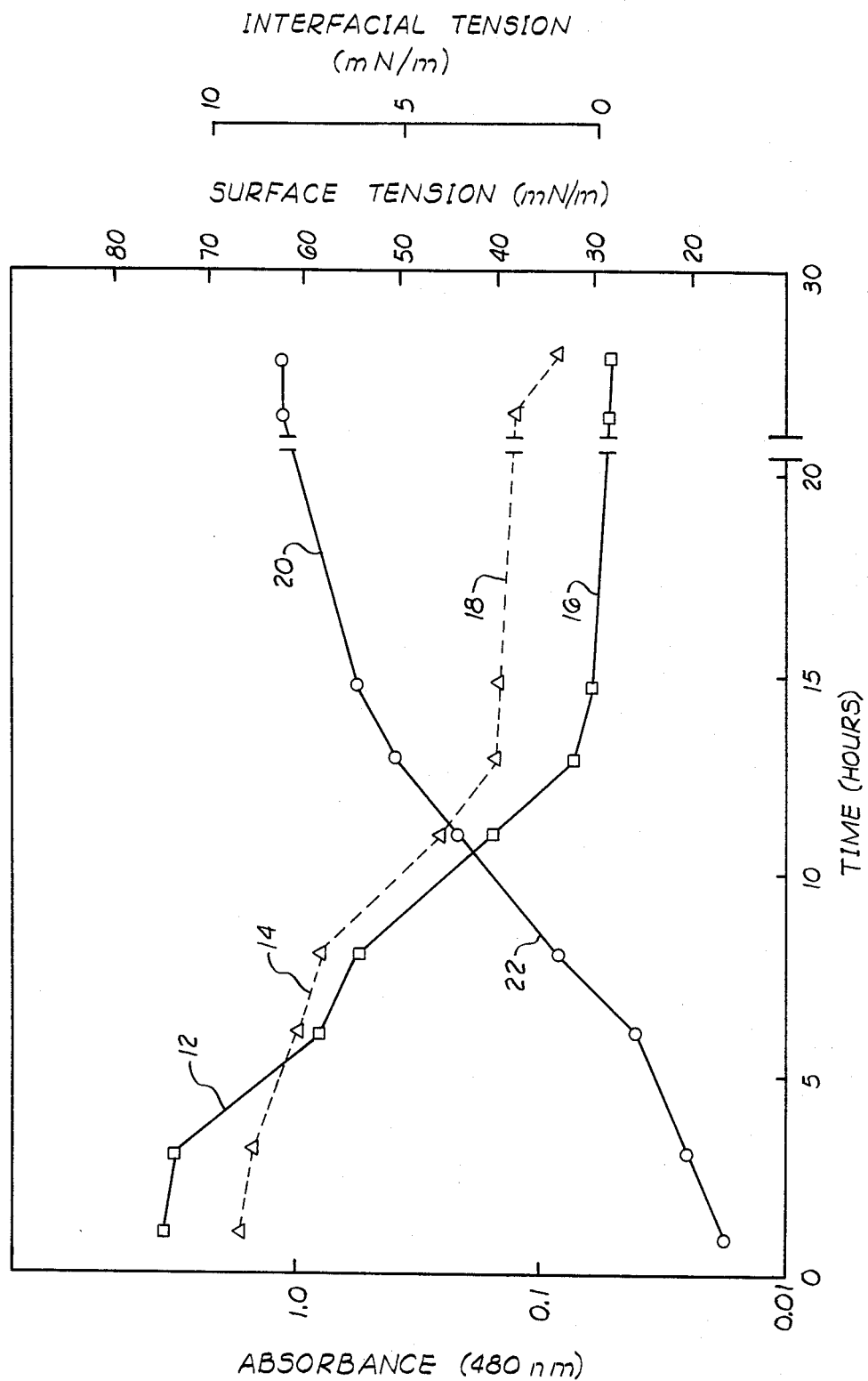

BIOSURFACTANT AND ENHANCED OIL RECOVERY

BACKGROUND OF THE INVENTION

1. Field of the Invention

The present invention relates generally to a biosurfactant, a biosurfactant-producing microorganism and their use, particularly, but not by way of limitation, in the enhancement of oil recovery from oil-bearing formations.

2. Description of Prior Art

While use has been made of synthetic surfactant injection into oil formations in attempts to enhance oil recovery, such use has been generally costly and not without problems. Relatively little has been done analogously with biosurfactants.

U.S. Pat. No. 2,413,278, issued to Zobell, discloses a method of facilitating oil recovery by injection of a bacteria of the Desulfovibrio genus into the oil formation. The bacterium is thought to feed upon high molecular weight hydrocarbons and among its beneficial products include surfactants or detergents.

U.S. Pat. No. 2,975,835, issued to Bond, discloses a method for simultaneously fracturing oil-bearing rock and injecting an oil-metabolizing bacterium.

U.S. Pat. No. 3,032,472, issued to Hitzman, discloses a method of facilitating oil recovery from oil-bearing formations by injection of bacterial spores, followed by subsequent induction of spore germination with injection of a nutrient such as molasses. Spores of the Desulfovibrio and Clostridium genera were found particularly suitable.

U.S. Pat. No. 3,340,930, issued to Hitzman, discloses a process of oil recovery involving the injection of numerous petroleum-metabolizing microorganisma. Preformed and/or added surface-active agents cause increased oil recovery.

A recent review of the field of surface-active compounds from microorganisms has been published as Cooper, et al. Surface-active Compounds from Microorganisms. Adv. in Appl. Microbiol. V. 26, pgs. 229 to 253 (1980).

BRIEF DESCRIPTION OF THE DRAWING

FIG. 1 is a graphical representation of bacterial growth, surface tension and interfacial tension with a culture of *Bacillus licheniformis* strain JF-2.

DESCRIPTION OF THE PREFERRED EMBODIMENT

A residual oil saturation remains in waterflooded oil-bearing formations. This oil is generally thought to be entrapped by capillary forces between the oil and rock of the formation. Surfactants which reduce surface tension and interfacial tension tend to reduce these capillary forces and thereby permit entrapped oil to be removed by further waterflooding.

The use of synthetic surfactants such as petroleum sulfonates to enhance waterflooding oil recovery, as mentioned earlier, has proven to be effective, yet costly and to present other problems. If an effective surfactant, produced by bacterial growing upon an economical feasible medium could be utilized, preferably by bacterial growth and surfactant production in situ, a more desirable mode of oil recovery could be achieved.

To identify and isolate a surfactant-producing bacteria compatible with the conditions of a subterranean oil-bearing formation, an appropriate procedure was devised. Water injection brine passing to the surface from a waterflooded Carter County, Okla. oil formation was utilized as a source of microorganisms. Ten-fold serial dilutions of the water-injection brine were plated onto 1.5% agar (Bacto) plates of medium E at 40° C.

Medium E contained the following nutrients: 5% (w/v) NaCl; 0.1% (w/v) $(NH_4)_2SO_4$; 0.025% (w/v) $MgSO_4$; 1% (w/v) sucrose; 100 mM Phosphate buffer (pH 7.0) and 1% (v/v) trace metals solution. The trace metals solution contained the following in gm/l:ethylene diamine tetraacetate, sodium salt (EDTA), 1.0; $MnSO_4$, 3.0; $FeSO_4$, 0.1; $CaCl_2$, 0.1; $CoCl_2$, 0.1; $ZnSO_4$, 0.1; $CuSO_4$, 0.01; $AlK(SO_4)_2$, 0.01; $H_3BO_3$, 0.01; and $Na_2MoO_4$, 0.01.

Microorganisms from about 30 individual colonies formed on the agar plates were picked and transferred to shake flasks containing 100 ml of medium E and aerobically cultured at 50° C. for 48 hours. The surface tensions of whole media were measured after 48 hours by testing the force required to extract a wire ring from the medium using a Fisher Autotensiomat ring detachment apparatus.

The microorganism culture producing the lowest surface tension was isolated as a pure culture for further study and subsequently identified as a new strain of *Bacillus licheniformis*, entitled *Bacillus licheniformis* strain JF-2 and registered with the American Type Culture Collection, Rockville, Md. as ATCC No. 39307.

*Bacillus licheniformis* strain JF-2 was cultured in 300 ml of medium E contained in a 500 ml Erlenmeyer flask shaken at 250 rpm and 40° C. in a New Brunswick G-24 incubator shaker. Periodically 10 ml aliquots of the culture were removed and subjected to the following measurements:

1. Turbidity, as measured by absorbance at 480 nm with a Bausch and Lomb Spectronic 21 spectrophotometer for an indication of cell growth;
2. Surface tension, as measured at 25° C. with a Fisher Autotensiomat ring detachment apparatus; and
3. Interfacial tension, as measured at 25° C. with a 15 ml overlay of n-hexadecane with a Fisher Autotensiomat ring detachment apparatus.

The results of this experiment are seen in FIG. 1. Both surface tension 12 and interfacial tension 14 reach relatively stable minimalized levels 16, 18 generally corresponding to the final phase 20 of *Bacillus licheniformis* strain JF-2 cell growth 22.

The surfactant-producing bacterium, identified as *Bacillus licheniformis* strain JF-2, is a gram-positive, motile, spore-forming rod with a length of about 1.5 to 2.0 $\mu$m, a width of about 0.7 to 1.0 $\mu$m. The sporangium is not swollen, whereas the spore is oval-shaped and sub-terminally positioned. Acid but not gas was produced during growth upon glucose, mannitol or arabinose. Casein, starch and gelatin were hydrolized by *Bacillus licheniformis* strain JF-2 growth thereupon. Growth occurred at 50° C. but was optimal at 40° C. In Tryptic Soy Broth (Difco), growth occurred at a pH between about 4.6 and 9.0, and at NaCl concentrations ranging up to about 10% (w/v). This bacterium grew anaerobically on Plate Count Agar (Difco) with 0.1% (w/v) $NaNO_3$.

*Bacillus licheniformis* strain JF-2 will not grow with hydrocarbons as the sole carbon source, but hydrocarbons have no effect upon bacterium growth in a carbohydrate-containing medium.

The surfactant produced by *Bacillus licheniformis* strain JF-2 was tentatively named lichenysin and subjected to several tests.

The effect of NaCl upon lichenysin's induction of decreased surface tension of aqueous solutions was measured in the following system. A crude extract of lichenysin was prepared by growing *Bacillus licheniformis* strain JF-2 in 250 ml of medium E rotating at 250 rpm and 40° C. for 48 hours. The culture was then centrifuged at 17,400× g for 10 minutes. The supernatant solution was adjusted to a pH of about 2.0 with 12 N HCl. A white precipitate formed, allowed to settle for 12 hours at 3° C. and was then collected by centrifugation at 5870×g for 30 min. The precipitate was then suspended in a minimal amount of distilled water and the suspension adjusted to about pH 7.0 with 1 N NaOH and the precipitate at least partially dissolved. The solution was then lyophilized and yielded a dry crude lichenysin extract residue of about 0.24 g per liter of culture broth.

Aqueous solutions having 1500 ppm crude lichenysin extract residue were then prepared with the various concentrations of NaCl seen in Table 1 and their surface tensions measured as millinewtons per meter (mN/m) at 25° C.

As seen in Table 1, the lowering of surface tension effected by the crude extract of lichenysin is not substantially inhibited by NaCl concentrations of up to 15 g 100 ml. This relative insensitivity to NaCl both distinguishes lichenysin from many surfactants previously identified and suggests that lichenysin should be particularly effective as a surfactant in the briny millieu permeating most oil formations (averaging about 5% NaCl). Lichenysin appears to be maximally effective as a surfactant at about 5% NaCl.

For the study of temperature effects upon surface tension, a lichenysin preparation was produced as follows. A culture of *Bacillus licheniformis* strain JF-2 grown to early stationary phase in medium E was centrifuged at 4080×g for 10 minutes to remove cells. Air was bubbled through the supernatant solution and the resultant foam collected in a separate container. The lichenysin was concentrated about 12-fold by this foam-stripping procedure.

The effects of temperature upon the surface tension of foam-concentrated lichenysin were measured with a Fisher Autotensiomat and the results seen in Table 2. The samples were incubated at the designated temperatures for 20 minutes and cooled to 25° C. for surface tension measurements. Incubation at the designated temperatures for this time period showed little, if any, inhibition of lichenysin's surface tension lowering effects. This result illustrates the compatibility of this surfactant with the elevated temperatures sometimes present in subterranean oil-bearing formations.

TABLE 1

Effect of NaCl Concentration Upon Surface Tension

| NaCl g/100 ml | Surface Tension mN/m |
|---|---|
| 0 | 31.0 |
| 1 | 29.5 |
| 2 | 28.5 |
| 3 | 27.5 |
| 4 | 27.0 |
| 5 | 27.0 |
| 7 | 27.5 |

TABLE 1-continued

Effect of NaCl Concentration Upon Surface Tension

| NaCl g/100 ml | Surface Tension mN/m |
|---|---|
| 9 | 28.0 |
| 11 | 28.5 |
| 13 | 29.0 |
| 15 | 29.5 |
| 20 | 39.5 |

TABLE 2

Effect of Temperature Upon Surface Tension

| Temp °C. | Surface Tension mN/m |
|---|---|
| 25 | 27.50 |
| 40 | 27.50 |
| 70 | 28.0 |
| 90 | 28.0 |
| 120 | 29.5 |
| 140 | 31.0 |

The effect of pH upon lichenysin's lowering of surface tension was measured upon a broth obtained from an early stationary phase culture of *Bacillus licheniformis* strain JF-2 in medium E. The pH of the broth was adjusted with concentrated HCl or NaOH and volume changes were shown not to be a factor of importance. The surface tensions were measured as described above. As seen in Table 3, lichenysin is an effective surfactant from at least about pH 6.2 to about pH 10.0.

Calcium is a major component of many oilfield brines and is sometimes present at concentrations in excess of 1,000 mg/l.

TABLE 3

Effect of pH Upon Surface Tension

| pH | Surface Tension mN/m |
|---|---|
| 2.0 | 55 |
| 3.4 | 46 |
| 4.5 | 44 |
| 6.2 | 27 |
| 8.0 | 27 |
| 10.0 | 27 |
| 12.0 | 49 |

The effects of calcium concentration upon the surface tension of a crude lichenysin extract solution both with and without 5% NaCl are seen in Table 4. The surface tension, measured as described earlier, is unaffected by up to 339 mg calcium chloride per liter, and is only mildly increased by a calcium chloride concentration of 3734 mg/l. The results of this experiment illustrate the compatibility of lichenysin as a surfactant with brines of high calcium content.

TABLE 4

Effect of Calcium Concentration on Surface Tension

| Crude extract (1500 mg/liter) in | mN/m at 25 C. in presence of calcium (mg/liter) | | | | |
|---|---|---|---|---|---|
| | 0 | 3.4 | 34 | 339 | 3734 |
| Deionized Water | 30.0 | 29.0 | 27.5 | 27.5 | 31 |
| 5% NaCl | 26.5 | 27.0 | 27.0 | 27.0 | 31 |

In one experiment two 2.5×45.7 cm glass columns (A and B) were filled with sand by the addition of a saline (5% NaCl) slurry of white quartz sand (flint shot) and maintained at 25° C. The sand columns were sterilized by pumping through one pore volume of 0.2% chlorine dioxide solution (Oxine, Biocide Chemical Co., Norman, OK). Each column was then vertically flooded with crude oil (Cleveland County, OK. well) to an irreducible water saturation (until no water is present in the effluent) and then flooded with water until no further oil appeared in the effluent.

With column A a broth culture (medium E) of *Bacillus licheniformis* strain JF-2 in early stationary phase was pumped upwards through the sand column. The rate of movement of the broth front was about 5 inches per hour. With column B a 5% NaCl solution was similarly pumped.

Although the results of this experiment are strictly qualitative, and the conditions quite different from those of a subterranean oil-formation, the results were significant. Residual oil in column A was mobilized during passage of the lichenysin-containing broth and began to exude with the effluent while no oil recovery was noted with column B. These results indicate that lichenysin mobilizes oil in this sand column model and should have a significant role to play in modes of surfactant-induced enhanced oil recovery.

A process for enhanced oil recovery from a waterflooded oil-containing formation would involve the following steps:

1. providing a source of viable *Bacillus licheniformis* strain JF-2 cells, preferably a cell suspension in a nutrient or isotonic medium;
2. injecting a quantity of viable cells into the oil-containing formation;
3. providing a source of nutrient for *Bacillus licheniformis* strain JF-2, preferably a nutrient comprising assimilable carbohydrate as well as assimilable nitrogen-containing compounds and trace metals; and
4. injecting a quantity of the nutrient into the oil-bearing formation, preferably along the path of cell injection.

After injection of nutrient the formation would preferably be sealed for a period of time to allow intraformation bacterial proliferation and production of lichenysin. The surfactant action of lichenysin should act to loosen formation-entrapped oil and permit an enhanced amount of oil recovery upon recommencement of waterflooding.

A preferable *Bacillus licheniformis* strain JF-2 nutrient would be one containing a carbohydrate source such as molasses, grain wort or grain malts and a nitrogen source such as alkali metal nitrates, alkali metal ammonium salts, ammonia, protein digests, protein hydrolysates, protein peptones or corn steep liquor.

A preferable step, after injection of cells into the formation, would be the subsequent injection of a growth-limiting but cell-sustaining nutrient to disperse viable cells into the formation before inducing their proliferation and maximal lichenysin production.

A biologically pure culture of the microorganism *Bacillus licheniformis* strain JF-2 having the identifying characteristics of ATCC No. 39307 described earlier has been prepared. This culture produces the surfactant lichenysin in recoverable quantity upon fermentation in an aqueous medium containing assimilable sources of carbon, nitrogen and inorganic substances.

*Bacillus licheniformis* strain JF-2 is a spore-forming organism whose spores are inducible by permitting growth until nutrients become exhausted. The spores will then be isolated by standard centrifugal techniques followed by washing with mineral medium (no carbon source) to remove germination materials and cell debris. This will result in clean spores of *Bacillus licheniformis* strain JF-2 substantially free of vegetative cells.

Such spores will be suspended in brine or mineral medium and injected into a waterflooded oil-bearing formation. Spore injection will be followed by injection of a *Bacillus licheniformis* strain JF-2 nutrient to induce spore germination and the formation and proliferation of *Bacillus licheniformis* strain JF-2 cells within the formation. A period of sealing preferably would follow the nutrient injection into the formation to allow bacterial proliferation and lichenysin production.

The Bacillus strain JF-2 nutrient for inducing spore germination and bacterial proliferation would be preferably selected from commercially feasible sources of carbohydrate such as molasses, grain worts or grain malts and sources of nitrogen such as alkali metal nitrates, alkali metal ammonium salts, ammonia, protein digests, protein hydrolysates, protein peptones or corn steep liquor.

Dispersion of the spores into the formation would be preferably accomplished by following spore injection with injection of a mineral medium such as brine.

One preferred method of enhanced oil recovery would be to inject a quantity of the surfactant lichenysin into the formation. The lichenysin could be that contained in a bacterial culture medium obtained by culturing *Bacillus licheniformis* strain JF-2 cells in a nutrient medium.

If desired, the cells from the culture medium could be separated by conventional means and the clarified broth injected into the formation.

Lichenysin for formation injection could preferably be at least partially purified from a culture broth, for example by acid precipitation and redissolution in aqueous solution, before injection.

A partial purification of lichenysin may also be effected by first bubbling air through a clarified *Bacillus licheniformis* JF-2 culture broth to generate a foam. The foam may be recovered and used to treat formations or may first have its pH adjusted to about 2.0 with an acid such as HCl. The precipitate produced by acidification, a partially purified lichenysin, may be recovered and at least partially redissolved in aqueous solution for injection into a formation.

The surfactant lichenysin, as described earlier, has particular properties making it a potentially superior surfactant for enhanced oil recovery. These properties may be summarized as follows:

1. Solubility in aqueous solutions containing up to 10% (w/v) NaCl;
2. Effectiveness in lowering the surface tension of aqueous solutions despite incubations at up to 140° C.;
3. Effectiveness in inducing a surface tension reduction in aqueous solutions having a 5% NaCl content which is substantially unaffected by pH changes between about 6.2 and 10.0; and
4. Effectiveness in inducing a surface tension reduction substantially uninhibited by up to about 340 mg/l calcium chloride both in the presence and absence of 5% NaCl.

Changes may be made in the construction, operation and arrangement of the various parts, elements, steps and procedures described herein without departing from the concept and scope of the invention as defined in the following claims.

What is claimed is:

1. A process for enhancing the amount of oil recoverable from a waterflooded oil-containing formation comprising:
   injecting a quantity of viable *Bacillus licheniformis* strain JF-2 cells into the waterflooded oil-containing formation; and
   injecting a quantity of *Bacillus licheniformis* strain JF-2 nutrient into the waterflooded oil-containing formation.

2. The process of claim 1 defined further to include the step of:
   sealing the waterflooded formation after nutrient injection.

3. The process of claim 1 wherein the nutrient is defined further as comprising a source of carbon selected from the group consisting of molasses, grain malts or grain worts and a source of nitrogen selected from the group consisting of alkali metal nitrates, ammonia, alkali metal ammonium salts, protein digests, protein hydrolysates, protein peptones or corn steep liquor.

4. The process of claim 3 defined further to include the step of:
   sealing the waterflooded formation after nutrient injection.

5. The process of claim 3 defined further to include, after injection of *Bacillus licheniformis* strain JF-2 cells:
   injecting diluted *Bacillus licheniformis* strain JF-2 nutrient capable of sustaining viable cells but not capable of inducing their proliferation, to disperse injected cells.

6. The process of claim 5 defined further to include the step of:
   sealing the waterflooded formation after nutrient injection.

7. The process of claim 1 defined further to include, after injection of *Bacillus licheniformis* strain JF-2 cells:
   injecting a quantity of diluted *Bacillus licheniformis* strain JF-2 nutrient, capable of sustaining viable cells but not capable of inducing their proliferation, to disperse injected cells.

8. The process of claim 7 defined further to include the step of:
   sealing the waterflooded formation after nutrient injection.

9. A process for enhancing the amount of oil recoverable from a waterflooded oil-containing formation comprising:
   injecting a quantity of viable *Bacillus licheniformis* strain JF-2 spores into the waterflooded oil-containing formation; and
   injecting a quantity of *Bacillus licheniformis* strain JF-2 nutrient into the waterflooded oil-containing formation.

10. The process of claim 9 defined further to include the step of:
    sealing the waterflooded formation after nutrient injection.

11. The process of claim 9 wherein the nutrient is defined further as comprising a source of carbon selected from the group consisting of molasses, grain malts or grain worts, and a source of nitrogen selected from the group consisting of alkali metal nitrates, alkali metal ammonium salts, ammonia, protein digests, protein hydrolysates, protein peptones or corn steep liquor.

12. The process of claim 11 defined further to include the step of:
    sealing the waterflooded formation after nutrient injection.

13. The process of claim 11 defined further to include, after injection of *Bacillus licheniformis* strain JF-2 spores:
    injecting a quantity of mineral medium, capable of sustaining viable spores but not capable of sustaining their germination into proliferating cells, to disperse the spores.

14. The process of claim 13 defined further to include the step of:
    sealing the waterflooded formation after nutrient injection.

15. The process of claim 9 defined further to include, after injection of *Bacillus licheniformis* strain JF-2 spores:
    injecting a quantity of mineral medium, capable of sustaining viable spores but not capable of including their germination, to disperse the spores.

16. The process of claim 15 defined further to include the step of:
    sealing the waterflooded formation after nutrient injection.

17. A process for enhancing the amount of oil recoverable from a waterflooded oil-containing formation comprising:
    injecting a quantity of lichenysin into the oil-containing formation.

18. The process of claim 17 wherein the lichenysin is defined further as being contained in a bacterial culture medium obtained by culturing *Bacillus licheniformis* strain JF-2 cells in a nutrient medium.

19. The process of claim 18 wherein the lichenysin is defined yet further as being contained in a broth produced by separation of *Bacillus licheniformis* strain JF-2 cells from the bacterial culture medium.

20. The process of claim 19 wherein the lichenysin is defined further as being at least partially purified from the broth.

21. The process of claim 20 wherein the purification is further defined as comprising:
    bubbling air through the broth producing a foam; and
    recovering the foam as a partially purified lichenysin.

22. The process of claim 21 wherein the purification is defined further as comprising the steps of:
    adjusting the pH of the foam to about 2.0, producing a precipitate; and
    recovering the precipitate as a further partially purified lichenysin.

* * * * *

UNITED STATES PATENT AND TRADEMARK OFFICE
CERTIFICATE OF CORRECTION

PATENT NO. : 4,522,261

DATED : June 11, 1985

INVENTOR(S) : Michael J. McInerney, et al.

It is certified that error appears in the above-identified patent and that said Letters Patent is hereby corrected as shown below:

Column 8, lines 27 and 28, the word "including" should be --inducing--.

Signed and Sealed this

Twenty-ninth Day of October 1985

[SEAL]

Attest:

Attesting Officer

DONALD J. QUIGG

Commissioner of Patents and Trademarks—Designate